Patented Sept. 25, 1945

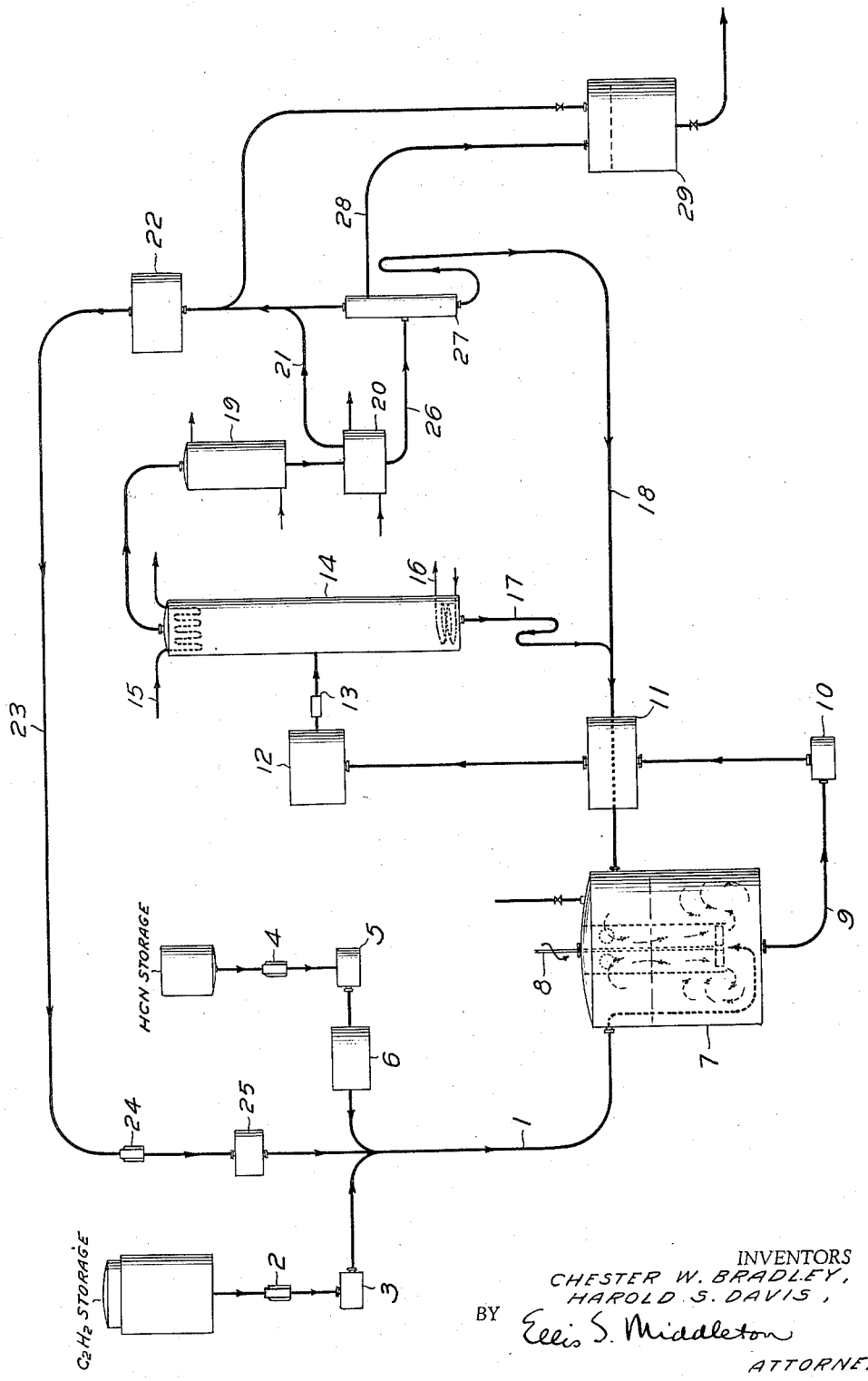

2,385,327

UNITED STATES PATENT OFFICE 2,385,327

METHOD OF PRODUCING ACRYLONITRILE

Chester W. Bradley, Old Greenwich, and Harold S. Davis, Riverside, Conn., assignors to American Cyanamid Company, New York, N. Y., a corporation of Maine Application October 4, 1941, Serial No. 413,590

7 Claims. (Cl. 260—464)

The present invention relates to the production of acrylonitrile, and more particularly to an improved method for the catalytic production of acrylonitrile from hydrocyanic acid and acetylene.

It is known that acrylonitrile may be obtained by passing a mixture of hydrocyanic acid and acetylene over such materials as activated carbon, silica gel and metal cyanides heated at temperatures ranging from 400 to 500° C. Although these substances definitely catalyze the reaction, considerable side reactions occur and the rate of production of acrylonitrile is relatively slow. Consequently, the yield and quality of the nitrile produced under these conditions are not conducive to commercial operation.

The principal object of this invention is to devise a method wherein acrylonitrile may be readily and cheaply obtained. Another object resides in a method for the production of acrylonitrile requiring only simple equipment with high efficiencies. A further object is the provision of an improved method for catalytically producing acrylonitrile from hydrocyanic acid and acetylene. Other objects will appear hereinafter.

It has been found that the above objects may be attained by establishing a cycle of operation which includes the steps of continuously reacting together in a catalytic chamber acetylene and hydrocyanic acid in the presence of a heated solution of a catalyst for the reaction while maintaining the partial pressure of the acetylene substantially in excess of the partial pressure of the hydrocyanic acid in the catalytic chamber, continuously withdrawing a portion of the catalyst solution from the catalytic chamber, stripping the dissolved acrylonitrile from said solution and returning the stripped catalyst solution to the catalytic chamber.

A convenient method of carrying out the above cycle of operation is to continuously charge a heated acid reacting catalyst containing an aqueous solution of a cuprous salt, preferably maintained at a temperature within the range of 60 to 90° C., with acetylene and hydrocyanic acid, said materials being introduced in such a state that the concentration, or in other terms, the partial pressure of the acetylene always substantially exceeds that of the hydrocyanic acid in the catalytic chamber, continuously withdraw a portion of the catalyst solution from the catalytic chamber, strip said solution of dissolved acrylonitrile, unreacted acetylene and by-products, recover the acrylonitrile and return the stripped catalyst solution to the catalytic chamber.

The operation may, for example, be accomplished in the apparatus shown in the accompanying diagram in which acetylene and hydrocyanic acid are introduced from storage into feed-line 1, the former through meter 2 and pump 3, and the latter through meter 4, pump 5 and vaporizer 6. The gases then pass from feed-line 1 into chamber 7 containing the catalyst. The partial pressure of the acetylene is maintained substantially in excess of the partial pressure of the hydrocyanic acid in the catalytic chamber by meter-control of the flow of the gases fom storage into feed-line 1. The catalytic chamber is heated to the desired temperature by a suitable heating device not shown. Agitator 8 provides thorough contact of the acetylene and hydrocyanic acid with the catalyst. A portion of the catalyst solution containing acrylonitrile, unreacted acetylene and by-products (mainly vinyl acetylene and acetaldehyde) is continuously withdrawn from the catalytic chamber through line 9 by means of pump 10 and circulated through a heat exchanger 11. The solution then enters the preheating vessel 12 maintained at a temperature of approximately 100° C. wherein further reaction of small quantities of dissolved hydrocyanic acid and acetylene is promoted. The pressure release valve 13 operates automatically to maintain a sufficiently higher pressure in vessel 12 to prevent the separation of gases from the catalyst. From the preheating vessel 12 the solution passes to the stripping column 14 which is provided at the top with a cooling coil 15 and at the bottom with heating means 16, such as a steam coil or electrical heater. In the operation of the column 14, the catalyst solution is heated to boiling temperature by heating means 16, stripped of the dissolved acrylonitrile, unreacted acetylene and by-products and returned through lines 17 and 18 and heat exchanger 11, to the catalytic chamber. The vapors of acrylonitrile and water and the unreacted acetylene and by-products pass from the stripping column into the condenser and separator 19 wherein the acrylonitrile and water are condensed. Undesirable by-products such as vinyl acetylene are removed from the unreacted acetylene gas to a considerable extent by solution in the condensate.

From the receiving vessel 20 the unreacted acetylene and remaining by-products pass through line 21 to absorption vessel 22 wherein the by-products are entrapped and the unreacted acetylene is returned through line 23, meter 24 and pump 25 to the cycle. Vessel 22 is preferably provided in duplicate with means for alternately directing the gas flow through one vessel or the other. When the absorbent in the vessel through which the gas is flowing loses its capacity to effectively absorb the by-products, the gas flow is directed through the other vessel and the exhausted absorbent regenerated, e. g., by steaming.

The condensate of acrylonitrile and water passes from receiving vessel 20 through line 26 to tank 27 wherein it stratifies into two layers.

The lower or predominantly water layer is returned through line 18 to the catalytic chamber and the upper or predominantly acrylonitrile layer containing a portion of the by-products passes through line 28 to receiving tank 29 from whence it may be withdrawn and purified, as for example, by fractional distillation.

Absorbents which may be utilized for the removal of by-products from the excess acetylene are solids such as activated charcoal, fuller's earth and calcined bauxite. Liquids may also be used, preferably in continuous counter-current absorption, such as for example, higher alcohols, glycerol, glycol, dibutyl phthalate and refined paraffin base mineral oil.

As a catalyst for the reaction of acetylene with hydrocyanic acid to form acrylonitrile, this invention utilizes an acid solution of a cuprous salt (e. g., cuprous chloride, bromide, iodide, cyanide, formate, acetate, etc.). A soluble salt of ammonium, an amine or an alkali metal is added for the purpose of holding the otherwise relatively insoluble cuprous salt in solution, probably by combining with it to form a soluble complex salt. The advantage of the acidic nature of the catalyst is that it prevents the formation of potentially explosive acetylides.

A typical example of the catalyst composition (parts being by weight) is as follows: 272.5 parts of cuprous chloride, 147 parts of ammonium chloride, 3.5 parts of concentrated hydrochloric acid (37%) and 300 parts of water. In preparing the catalyst solution the preceding proportions need not be adhered to rigidly. However, it is preferable that the aqueous solution be highly concentrated with respect to the cuprous chloride. The amount of acid added is such that when the solution reaches its clear yellow state it is acid to Congo red paper and shows a pH of 2 to 4 on standard alkacid paper.

The data given in the following table represent a total run of 56.6 hours with a single catalyst solution, operating under the following conditions:

Initial catalyst composition 381.5 g. CuCl, 204.8 g. NH$_4$Cl, 420 g. H$_2$O, 4.9 g. conc. HCl.

Stirring rate of catalyst solution, 2400 R. P. M.

Catalyst volume, 700 cc. (at reaction temperature), one-fifth of which continuously passes through the stripping system.

Total pressure in apparatus, approximately one atmosphere.

Table

| Feed in (mols.) | | Period of operation, hours | Temp. of catalyst, °C. | Acrylonitrile produced, mol/hour | Percent yield of acrylonitrile on basis of consumed | |
|---|---|---|---|---|---|---|
| C$_2$H$_2$ | HCN | | | | C$_2$H$_2$ | HCN |
| 7.82 | 4.69 | 16.9 | 82–86 | 0.156 | 49 | 64 |
| 2.34 | 1.75 | 6.0 | 82–84 | 0.189 | 72 | 83 |
| 1.00 | 0.83 | 3.0 | 86 | 0.187 | 63 | 85 |
| 2.04 | 0.98 | 4.7 | 82 | 0.165 | 67 | 85 |
| 2.90 | 1.46 | 6.0 | 77–78 | 0.164 | 70 | 81 |
| 2.59 | 1.41 | 5.5 | 86 | 0.145 | 64 | 73 |
| 1.54 | 0.91 | 4.0 | 76–78 | 0.139 | 59 | 82 |
| 1.94 | 1.25 | 5.0 | 76 | 0.146 | 74 | 80 |
| 2.08 | 1.24 | 5.5 | 76–77 | 0.124 | 64 | 82 |

In carrying out the present process the step of stripping the catalyst solution is of particular importance in that it not only affords a simple means of recovering the acrylonitrile from the catalytic chamber but in addition it removes the harmful by-products. For instance, if vinyl acetylene is not removed it will further react with acetylene and also polymerize to produce new products of higher boiling point and decrease volatility, the latter eventually giving tar-like substances which poison the catalyst and lower the yield of acrylonitrile.

The method herein described is characterized by the following:

1. High rate of acrylonitrile production per unit volume of catalyst solution.
2. High yields of acrylonitrile based on the acetylene and hydrocyanic acid consumed.
3. Long life of the catalyst solution.
4. Ease of removal of acrylonitrile from the catalyst solution and its recovery in liquid form.
5. Safe operation in acid catalyst thus avoiding the formation of explosive acetylides.
6. Continuous operation of the process.
7. Maintaining the concentration of acrylonitrile in the catalytic chamber below the point where its rate of formation may be retarded by its own concentration.
8. Removal of volatile by-products from the catalytic chamber which interfere with acrylonitrile formation.
9. Operation at moderate temperatures not exceeding approximately 100° C. and under moderate pressures.

It is probable that an increase of total pressure would cause a more rapid reaction rate since the solubility of the hydrocyanic acid and acetylene in the catalyst solution depends on their pressures. However, due to the explosive nature of acetylene at higher pressures, two atmospheres is considered to be the upper practicable limit.

While the invention has been described with particular reference to specific embodiments, it is to be understood that it is not to be limited thereto but is to be construed broadly and restricted solely by the scope of the appended claims.

We claim:

1. The method of producing acrylonitrile which includes the steps of continuously reacting together acetylene and hydrocyanic acid in a heated solution of a cuprous salt as a catalyst, and a solubilizer therefor while maintaining the partial pressure of the acetylene substantially in excess of the partial pressure of the hydrocyanic acid over the catalyst solution, continuously withdrawing a portion of the catalyst solution, stripping the dissolved acrylonitrile from said solution and returning the stripped catalyst solution to the cycle.

2. Method of claim 1 wherein the catalyst is heated at a temperature within the range of 60 to 90° C.

3. Method of claim 1, further characterized in that the reaction is carried out under a pressure not greater than substantially two atmospheres.

4. Method of claim 1, further characterized in that the catalyst comprises an acid-reacting aqueous cuprous chloride solution.

5. Method of claim 1, in which the solubilizer for the catalyst includes a compound selected from the class consisting of ammonium, amine and alkali metal salts.

6. The method of producing acrylonitrile which includes the steps of continuously reacting together acetylene and HCN in a heated solution of a cuprous salt as a catalyst, and a solubilizer therefor, while maintaining the partial pressure of the acetylene substantially in excess of the partial pressure of the hydrocyanic acid over the catalyst solution, continuously withdrawing a portion of the catalyst solution, heating said portion of the catalyst solution at a temperature of approximately 100° C., removing from said solution vapors of acrylonitrile and water, unreacted acetylene and by-products, returning the catalyst solution to the cycle, condensing the vapors of acrylonitrile and water, separating the unreacted aceylene from the by-products, returning the unreacted acetylene to the cycle, permitting the condensate or acrylonitrile and water to stratify into two layers, returning the lower or water layer to the cycle and recovering the upper layer of acrylonitrile.

7. The method of producing acrylonitrile which includes the steps of continuously reacting together acetylene and hydrocyanic acid in an aqueous solution of cuprous chloride and a solubilizer therefor heated at a temperature within the range of 60 to 90° C. while maintaining the partial pressure of the acetylene substantially in excess of the partial pressure of the hydrocyanic acid, continuously withdrawing a portion of the catalyst solution, heating said portion of the catalyst solution at a temperature of approximately 100° C., removing from said solution vapors of acrylonitrile and water, unreacted acetylene and by-products, returning the catalyst solution to the cycle, condensing the vapors of acrylonitrile and water, separating the unreacted acetylene from the by-products, returning the unreacted acetylene to the cycle, permitting the condensate of acrylonitrile and water to stratify into two layers, returning the lower or water layer to the cycle and recovering the upper layer of acrylonitrile.

CHESTER W. BRADLEY.
HAROLD S. DAVIS.